United States Patent
Rocher et al.

(10) Patent No.: US 11,879,404 B2
(45) Date of Patent: Jan. 23, 2024

(54) DEVICE AND METHOD FOR DETERMINING THE STATE OF ROTATION OF A CAMSHAFT OF AN ENGINE

(71) Applicant: VITESCO TECHNOLOGIES GMBH, Hanover (DE)

(72) Inventors: Jacques Rocher, Toulouse (FR); Yannick Leroy, Toulouse (FR); Benjamin Marconato, Toulouse (FR)

(73) Assignee: VITESCO TECHNOLOGIES GMBH, Hanover (DE)

( * ) Notice: Subject to any disclaimer, the term of this patent is extended or adjusted under 35 U.S.C. 154(b) by 287 days.

(21) Appl. No.: 17/416,046

(22) PCT Filed: Dec. 19, 2019

(86) PCT No.: PCT/EP2019/086179
§ 371 (c)(1),
(2) Date: Jun. 18, 2021

(87) PCT Pub. No.: WO2020/127643
PCT Pub. Date: Jun. 25, 2020

(65) Prior Publication Data
US 2022/0049664 A1 Feb. 17, 2022

(30) Foreign Application Priority Data
Dec. 19, 2018 (FR) ........................ 1873314

(51) Int. Cl.
*F02D 41/00* (2006.01)
*G01D 5/245* (2006.01)
*G01M 15/04* (2006.01)

(52) U.S. Cl.
CPC ......... *F02D 41/009* (2013.01); *G01D 5/2457* (2013.01); *G01M 15/046* (2013.01)

(58) Field of Classification Search
None
See application file for complete search history.

(56) References Cited

U.S. PATENT DOCUMENTS

| 6,341,253 B1 | 1/2002 | Honda |
| 7,000,598 B2 | 2/2006 | Sheikh et al. |

(Continued)

FOREIGN PATENT DOCUMENTS

| CN | 1702309 A | 11/2005 |
| CN | 1969117 A | 5/2007 |

(Continued)

OTHER PUBLICATIONS

International Search Report for PCT/EP2019/086179, dated Mar. 4, 2020, 4 pages.

(Continued)

*Primary Examiner* — Eric S. McCall
*Assistant Examiner* — Timothy P Graves
(74) *Attorney, Agent, or Firm* — NIXON & VANDERHYE

(57) ABSTRACT

A current source sensor delivers detection information in the form of an intermediate signal by selectively applying a low-level or high-level current to a communication bus depending on the passage of a mobile target, the sensor including a sensitive portion detecting the passage of a of the mobile target, an electronic module controlling and shape signals coming from the sensitive portion, an embedded intelligence module designed, inter alia, to receive information from another sensor through a first signal present on the communication bus, the first signal being the sum of the abovementioned intermediate signal generated by the sensor and of another intermediate signal generated by the other sensor, wherein the embedded intelligence module is adapted to modify a first low level and a first high level of (Continued)

the intermediate signal, respectively, into a second low level and into a second high level depending on a the first signal.

16 Claims, 3 Drawing Sheets

(56) References Cited

U.S. PATENT DOCUMENTS

| | | |
|---|---|---|
| 7,589,656 B2 | 9/2009 | Aspelmayr et al. |
| 8,713,992 B2 | 5/2014 | Bengtsson |
| 9,790,870 B2 | 10/2017 | Hou |
| 9,915,586 B2 | 3/2018 | Hou |
| 9,988,998 B2 | 6/2018 | Eom et al. |
| 10,371,072 B2 | 8/2019 | Gouzenne Coutier |
| 11,112,277 B2 | 9/2021 | Mirassou et al. |
| 2005/0263138 A1 | 12/2005 | Sheikh et al. |
| 2007/0229306 A1 | 10/2007 | Otterbach et al. |
| 2008/0027619 A1 | 1/2008 | Aspelmayr et al. |
| 2012/0291524 A1 | 11/2012 | Bengtsson |
| 2015/0300917 A1 | 10/2015 | Hou |
| 2015/0315988 A1 | 11/2015 | Hou |
| 2017/0175654 A1 | 6/2017 | Eom et al. |
| 2017/0322053 A1 | 11/2017 | Mirassou et al. |
| 2018/0080395 A1 | 3/2018 | Gouzenne Coutier |
| 2019/0107587 A1* | 4/2019 | Stewart ............... G01D 5/2451 |

FOREIGN PATENT DOCUMENTS

| | | |
|---|---|---|
| CN | 102713551 A | 10/2012 |
| CN | 104798305 A | 7/2015 |
| CN | 104813585 A | 7/2015 |
| CN | 107035561 A | 8/2017 |
| CN | 107209025 A | 9/2017 |
| CN | 107532529 A | 1/2018 |
| FR | 2 396 559 | 2/1979 |
| FR | 2 441 829 | 6/1980 |
| FR | 2 901 573 A1 | 11/2007 |
| GB | 2 001 792 A | 2/1979 |
| JP | 2001-090600 A | 4/2001 |

OTHER PUBLICATIONS

Written Opinion of the ISA for PCT/EP2019/086179, dated Mar. 4, 2020, 6 pages.
Office Action issued in Chinese Patent Application No. 201980084365.8 dated Nov. 2, 2022.

* cited by examiner

DEVICE AND METHOD FOR DETERMINING THE STATE OF ROTATION OF A CAMSHAFT OF AN ENGINE

This application is the U.S. national phase of International Application No. PCT/EP2019/086179 filed Dec. 19, 2019 which designated the U.S. and claims priority to FR Patent Application No. 1873314 filed Dec. 19, 2018, the entire contents of each of which are hereby incorporated by reference.

The present invention generally relates to the techniques of synchronizing an internal combustion engine. More specifically, it relates to a device and a method for determining the state of rotation of at least one camshaft of a heat engine.

BACKGROUND OF THE INVENTION

The control of the performance of an internal combustion engine, as well as the control of the emission of pollutants, are important parameters for motor vehicle manufacturers. To this end, the position, for example, of the pistons in their respective cylinder during an engine cycle needs to be known with relatively high precision.

Document FR 2441829 discloses means for detecting information relating to the position of the cylinders by identifying, on a target secured to a crankshaft, zones associated with angular positions corresponding to a determined phase of the stroke of different pistons. The secured target is made up of a disk having identification elements disposed along its periphery. A sensor, generally in a fixed position, then detects these identification elements and generates a signal made up of electric pulses allowing the passage, for example, to a top dead center (TDC) of a reference piston to be identified during an intake phase.

However, these identification elements alone are insufficient for precisely knowing the position of the cylinders during the engine cycle. Indeed, for a four-stroke internal combustion engine, the crankshaft completes two revolutions, that is an angle of 720°, before a given piston returns to its initial position. This means that, based solely on the observation of the rotation of the target secured to the crankshaft, it is not possible to provide information concerning each cylinder without uncertainty with respect to two engine strokes in the cycle, with the identification of the position of the top dead center covering both an intake phase and an exhaust phase.

Since precise determination of the position of each cylinder during an engine cycle cannot be deduced solely from the observation of the target secured to the crankshaft, finding additional information is therefore necessary in order to know whether the cylinder is in the first or in the second half of the engine cycle, i.e. the intake, then compression phase during the first revolution of the target secured to the crankshaft, or the expansion, then exhaust phase during the second revolution of said target.

In order to obtain such additional information, it is known for a person skilled in the art to use a disk (or target) securely mounted on a camshaft or even on any other shaft that is driven off the crankshaft by means of a ½ reduction gear. Combining the signals originating from the crankshaft sensor and from the camshaft sensor allows the system to precisely detect, for example, a top dead center in the intake phase of a reference cylinder.

For the sake of optimal control of the combustion, it is increasingly common for an internal combustion engine to comprise at least two camshafts, with, for example, a first camshaft associated with the exhaust and a second camshaft associated with the intake.

Furthermore, still for the sake of improving the performance of the internal combustion engine, it is also increasingly common for variable valve timing technology to be used, allowing improvement of the synchronization of the opening or closing of the intake or exhaust valves during an engine cycle. Thus, increasing numbers of sensors are used in order to be able to determine the position of the pistons during an engine cycle.

FIG. 1 illustrates a voltage source sensor 2, typical of the prior art, coupled for example to an engine control computer 4. The sensor 2 is, for example, a sensor dedicated to detecting the position of a camshaft of an internal combustion engine. Such a sensor 2 generally comprises three pins, with a first sensor pin 2_1 coupled, for example, to a first computer pin 4_1, which is intended, for example, to transmit a signal for activating the sensor 2, a second sensor pin 2_2 coupled to a second computer pin 4_2, which is intended to receive a signal representing the position of the camshaft, and, finally, a third sensor pin 2_3 coupled to a third computer pin 4_3, which is generally coupled to an electrical ground of the vehicle.

FIG. 2 shows a current source sensor 6 as disclosed, for example, in patent application FR1756119. This sensor 6 operates and is coupled to the engine control computer 4 using only two pins. For example, a first sensor pin 6_1 is coupled to the first computer pin 4_1, a second sensor pin 6_2 is coupled to the second computer pin 4_2. Thus, for performance levels identical to those of a voltage source sensor 2, one pin is freed up on the engine control computer 4, thus enabling savings with respect to the amount of wiring but also with respect to connectors.

The current source sensor 6 delivers information in the form of a rectangular "current" type signal. Thus, for a current sensor, two current levels are possible and they represent the presence or the absence of a tooth of the target in front of the sensor 6.

In order to further reduce the amount of wiring, patent application FR1756119 proposes parallel coupling of at least two current source sensors 6; such coupling is possible using a current measurement device called a "shunt". Thus, for example, it is possible to couple at least two current source sensors 6 on only two wires.

However, with such a setup, the current levels representing the presence or the absence of teeth in front of the current source sensors 6 sometimes coincide and it is difficult to determine the passage of a tooth past a sensor. Furthermore, it is also difficult to determine the source of the detected change in current level.

SUMMARY OF THE INVENTION

The invention proposes a device and a method for synchronizing an internal combustion engine that provide a partial or full solution to the technical shortcomings of the cited prior art.

To that end, a first aspect of the invention relates to a sensor delivering detection information in the form of a variation of a current using an intermediate signal, comprising a sensitive portion adapted to detecting the passage of a mobile target, an electronic module able to control and shape signals coming from the sensitive portion, an embedded intelligence module adapted, inter alia, to receive information from another sensor through the intermediate signal. The embedded intelligence module is adapted to modify a first low level and a first high level of the intermediate signal respectively into a second low level and into a second high level as a function of a first signal.

A second aspect further proposes an assembly of at least two current source sensors electrically coupled in parallel via a communication bus, the communication bus being adapted to causing a first signal to pass, the first signal being the sum of a first intermediate signal generated by the current source sensor and of a second intermediate signal generated by the current source sensor.

For example, the two sensors are coupled to an electronic computer.

A third aspect further proposes a method for determining the state of rotation of at least one rotary shaft of an internal combustion engine using at least two current source sensors, the method exhibiting the following steps:

a. a first step e1, consisting in activating at least two current source sensors (once a source of electrical power has been supplied to said current source sensors, b. a second step e2, consisting in detecting teeth using the current source sensor and, if the passage of a tooth of a target is detected, generating on an intermediate signal a square-wave pulse indicative of said passage of the tooth past the current source sensor, c. a third step e3, consisting, on the one hand, in using an embedded intelligence module to measure a first signal passing along a communication bus, the first signal being the sum of a first intermediate signal generated by the sensor and of a second intermediate signal generated by the sensor, and, on the other hand, in analyzing said first signal so that, if a first of the two sensors which generates a first high level on its intermediate signal also measures a first-signal value corresponding to a first critical value, then in this case moving on to a fourth step e4, otherwise, where appropriate, moving on to a fifth step e5, d. the fourth step e4 consisting in, in respect of the current source sensor that was the first to have a high level on its intermediate signal and to have had detected on the first signal a value corresponding to the first critical value, modifying, on the one hand, its first low level to a second low level and, on the other hand, modifying its first high level to a second high level before moving on to the fifth step e5, e. the fifth step e5 consisting in standard operation of the current source sensors.

For example, the first low level exhibits a value of 7 mA, the first high level exhibits a value of 14 mA.

It is also proposed for example that the first critical value should exhibit a value of 21 mA.

Advantageously, for example, the second low level exhibits a value of 10 mA, and the second high level exhibits a value of 20 mA.

Finally, for example, the engine is turning.

BRIEF DESCRIPTION OF THE DRAWINGS

Further features and advantages of the invention will become more clearly apparent from reading the following description. This description is purely illustrative and should be read with reference to the attached drawings, in which.

DETAILED DESCRIPTION OF THE PREFERRED EMBODIMENTS

Figure 1:
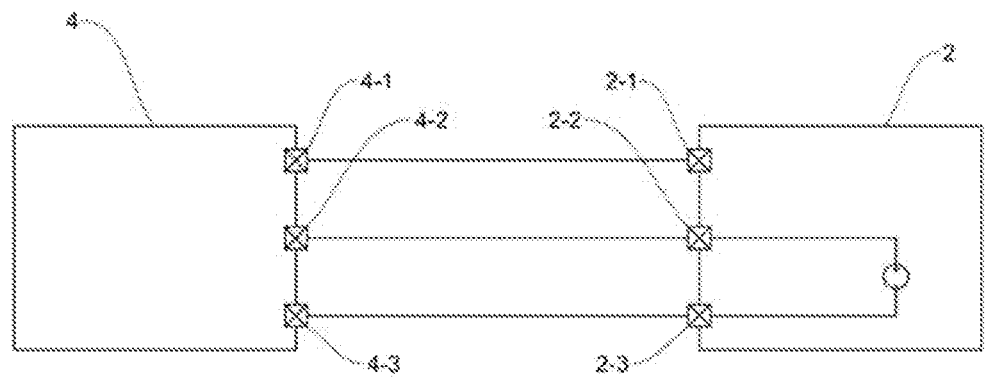
FIG. 1 shows a schematic view of a computer coupled to a voltage-source sensor.
Figure 2:
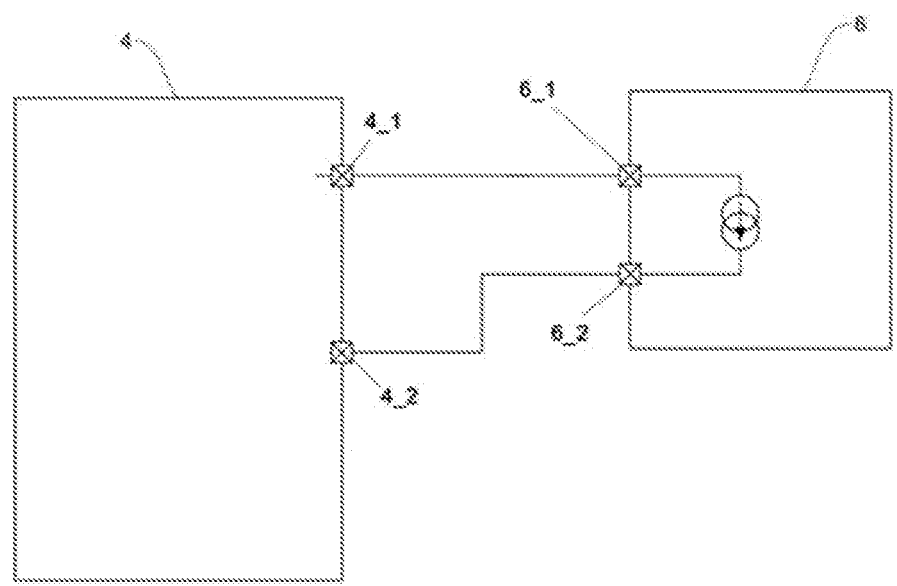
FIG. 2 shows a schematic view of a computer coupled to a current-source sensor.

An internal combustion engine comprises a determined number of pistons that can move in combustion chambers. The energy generated in the combustion chambers by the combustion of a fuel in said chambers is transferred by the pistons to the same engine shaft, also called crankshaft, or sometimes in the remainder of the description called "crank" or known by the abbreviation CRK. The intake of fuel and the exhaust of the combustion gases most often occur using valves controlled by at least one camshaft cooperating with the crankshaft, and sometimes known in the remainder of the description by the abbreviation CAM.

In order to know the position of the pistons in the cylinders during the operation of the internal combustion engine, i.e. during an engine cycle, a first target secured to the crankshaft is generally used to determine an angular position corresponding to a determined phase of the stroke of the various pistons. The first target is produced using a disk having identification elements disposed along its periphery, such as, for example, teeth. In order to know a reference point, for example, a top dead center of a piston, which is also a reference, a mechanical anomaly is generally used, i.e. one (or more) missing teeth on the periphery of the first target. Of course, the first target can comprise a variable number of teeth as a function of the desired precision.

As previously stated, in order to detect the movement of the first target during an engine cycle, a first sensor is used to detect the passage of the teeth past a sensitive portion of said first sensor. The first sensor uses, for example, Hall-effect technology and generates a voltage spike during the passage of a tooth of the first target.

In an alternative embodiment, the first sensor can be a current source sensor allowing a substantial reduction in the amount of electric wiring between said first sensor and the computer responsible for engine management.

The method of the invention will be presented in the case of an internal combustion engine with two camshafts. A first camshaft mounted on an intake controls the opening and the closing of the intake valves. The number of controlled intake valves can vary as a function of the type of internal combustion engine. A second camshaft for its part is mounted on the exhaust. This second camshaft is adapted to control exhaust valves. Of course, the number of controlled exhaust valves can vary.

The first camshaft is coupled to a second target that is secured to the first camshaft. Similarly, the second camshaft comprises a third target secured to the second camshaft.

The second target is, for example, a disk having a determined number of teeth on its periphery. The third target secured to the second camshaft is also a disk having a determined number of teeth on its periphery. In general, as known by a person skilled in the art, the second target and the third target are driven off the crankshaft by means of a ½ reduction gear. Thus, the second target and the third target complete one revolution for two revolutions of the first target. Throughout the remainder of the embodiment of the invention, the second target and the third target are identical and each have two teeth. The two teeth of the same target have different profiles, for example, two different lengths.

In order to deduce the position of the pistons in the cylinders during an engine cycle, a second sensor and a third sensor are advantageously used. For example, the second sensor is fixedly mounted opposite the second target and the third sensor is fixedly mounted opposite the third target.

In a preferred embodiment of the invention, the second sensor and the third sensor are current generator sensors. Furthermore, they are preferably coupled together in parallel. Thus, by virtue of this coupling and the current source technology of the two sensors, the saving with respect to the amount of wiring between the second sensor, the third sensor and the computer responsible for engine management is improved.

Figure 3:
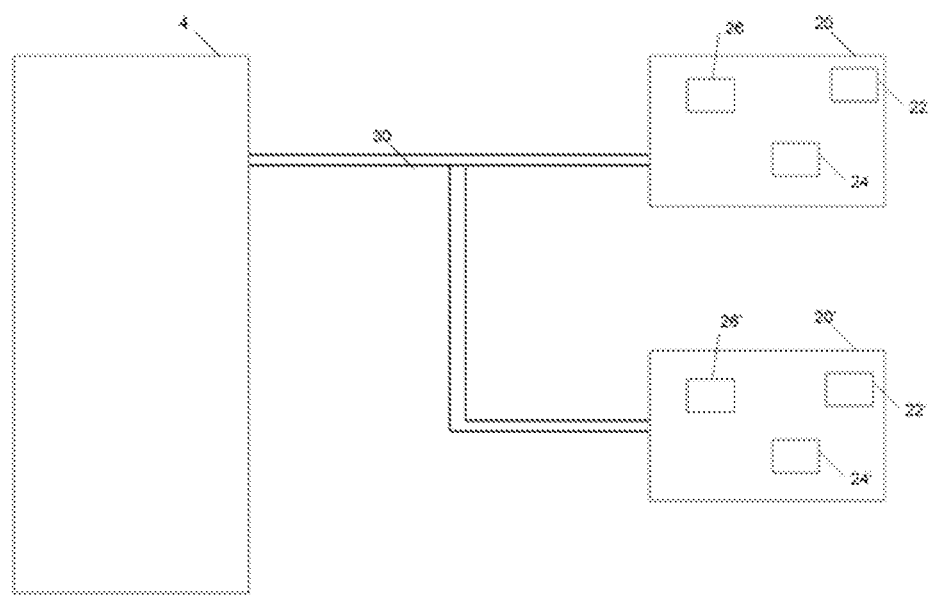
FIG. 3 shows a schematic view of a sensor according to the invention.

FIG. 3 illustrates a current source sensor 20 and a current source sensor 20' according to the present invention; as these sensors are identical, only the elements of the current source sensor 20 will be detailed in the remainder of the description.

Thus, the current source sensor 20 comprises a sensitive portion 22 adapted to detecting the passage of teeth of a target, an electronic module 24 able to control and shape signals coming from the sensitive portion 22, an embedded intelligence module 26 adapted, inter alia, to receive information from the other current source sensor 20' and to process and generate information destined for said other current source sensor 20'. The transfer of information within the current source sensors 20, 20' and externally, between the current source sensors 20, 20' and also to the electronic computer 4 are performed, according to one exemplary embodiment, using a communication bus 30. For the sake of the simplicity of the figures, the communication bus 30 is depicted only in part.

The embedded intelligence module 26 is also adapted to performing an analysis on a first signal passing along a communication bus 30.

As is known to those skilled in the art and also mentioned in the text of the description, the current source sensor 20 and the current source sensor 20' respectively generate, on outputs to the communication bus 30, a first intermediate signal and a second intermediate signal which form the first signal.

The first signal is made up of current variations indicative of the passage of the teeth past the sensitive portion 22 or 22'. In general, the first intermediate signal and the second intermediate signal have a first low level with a value of 7 mA and a first high level with a value of 14 mA. The first signal itself may therefore, in this particular instance and as a result of the current source sensors 20, 20' being connected in parallel, have a first value of 14 mA, a second value of 21 mA and finally a third value of 28 mA. Thus, for example, in the event that the sensor 20 generates a first low level of 7 mA and the sensor 20' generates a first high level of 14 mA, there will be a degree of ambiguity as to the source of said first high level and of said first low level (sensor 20 or sensor 20').

In one embodiment of the invention, the embedded intelligence module 26 is adapted to analyzing and determining the current level of the first signal passing along the communication bus 30 and, as a function of a determined strategy, is adapted to changing the first low level into a second low level and changing the first high level into a second high level for the current source sensor 20. Of course, depending on the determined strategy, it will be possible to switch the current levels of the current source sensor 20'.

Thanks to the invention, it is now possible to modify the first low level and the first high level of one of the two current source sensors 20, 20' in order to avoid there being any ambiguity regarding the current levels generated by the two current source sensors 20, 20' and passing along the communication bus 30, such as, for example, a current level of 21 mA.

The current thresholds for a sensor 20, 20' are, for example, a first low level exhibiting a value of 7 mA and a first high level exhibiting a value of 14 mA, a second low level exhibiting a value of 10 mA and a second high level exhibiting a value of 20 mA.

Figure 4:
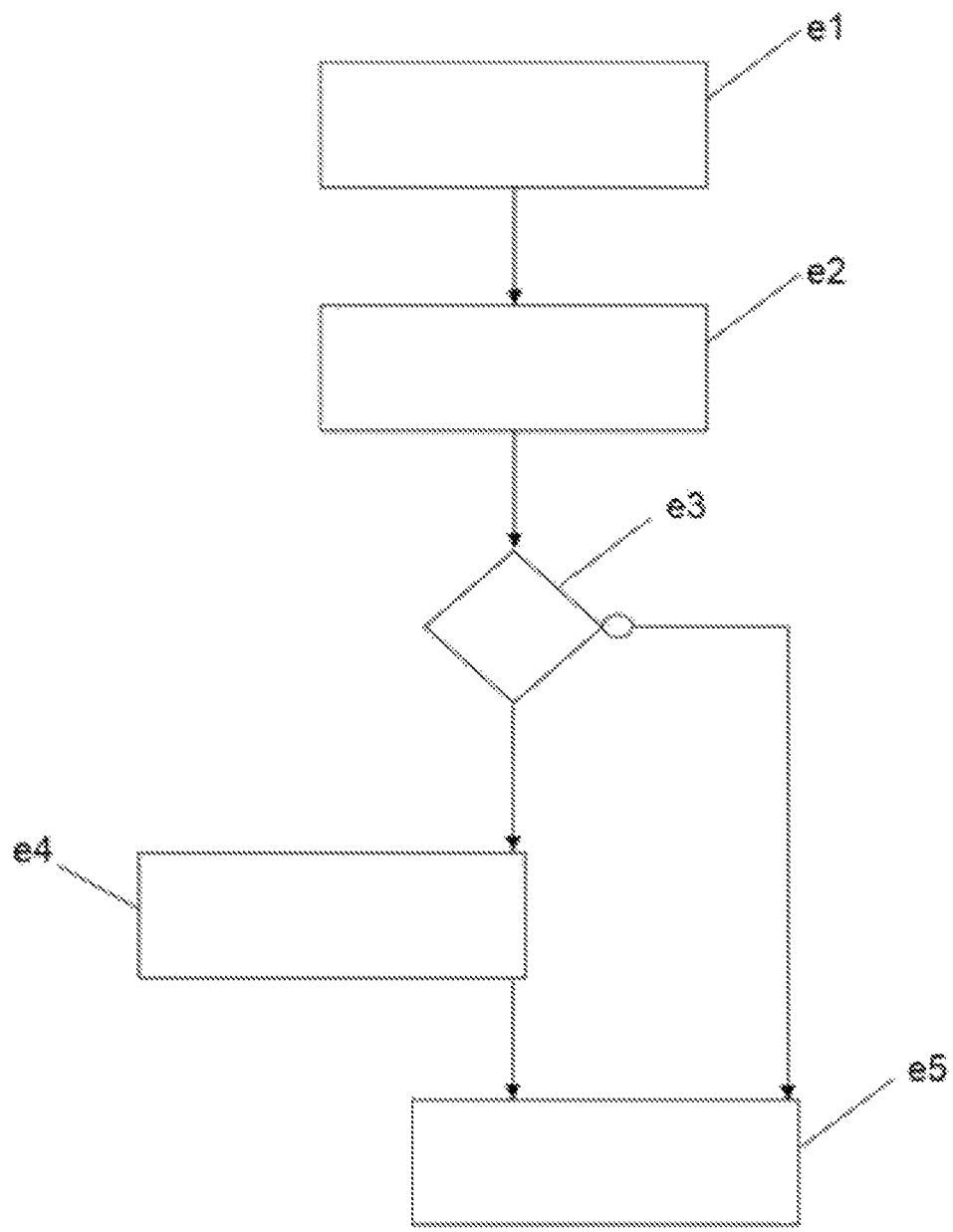
FIG. 4 depicts an algorithm according to the method of the invention.

The invention further proposes a method able to modify current thresholds of a current source sensor 20 or of a current source sensor 20'. FIG. 4 illustrates the method according to the present invention.

The method according to the invention exhibits a first step e1 consisting in activating at least two current source sensors 20, 20' once a source of electrical power has been supplied to said current source sensors 20, 20'. The method of the invention then foresees passing on to a second step e2. A person skilled in the art will appreciate that the expression "activating a sensor" implicitly includes an initialization phase and also other software and/or hardware steps involved in rendering said sensors operational.

The second step e2 consists in detecting teeth passing past the current source sensor 20, 20' and, if the passage of a tooth of a target is detected, in generating a square-wave pulse indicative of said passage of the tooth past the sensitive portion of said current source sensor 20, 20'. In the remainder of the description and in this embodiment of the method of the invention, it is the current source sensor 20 that is the first sensor to generate a square-wave pulse on the communication bus 30 handling communications between the two sensors and the electronic computer 4. What is meant by a square-wave pulse is the transition from a first low level to a first high level.

The method of the invention then foresees passing on to a third step e3 which consists in the embedded intelligence module 26 measuring and analyzing the first signal passing along the communication bus 30. Thus, cleverly, because the current source sensors 20, 20' are coupled in parallel to the communication bus 30, it is possible to deduce the state of the signal generated by the other current source sensor 20, 20'. Let us assume that the current source sensor 20' at this moment generates on the communication bus 30 a signal with a value of 7 mA corresponding to the first low level for said sensor.

Thus, the embedded intelligence module 26 during this third step e3 deduces a value of 21 mA, corresponding to 7 mA, namely the first low level for the current source sensor 20', plus 14 mA, namely the first high level for the current source sensor 20.

The method of the invention proposes, in the event that the value of the signal passing along the communication bus 30 is 21 mA, moving on to a fourth step e4, otherwise, where appropriate, the method proposes moving on to a fifth step e5 corresponding to normal operation of the current source sensors 20, 20'.

The fourth step e4 consists in modifying the low and high levels of the sensor that is applying a first high level to the communication bus 30. In this particular instance, this is the current source sensor 20. Thus, during the fourth step e4, the method according to the present invention proposes modifying the first low level into a second low level and modifying the first high level into a second high level before moving on to the fifth step e5 corresponding to normal operation of the current source sensors 20, 20'. In one exemplary embodiment, the second low level exhibits a value of 10 mA, and the second high level exhibits a value of 20 mA. The method then foresees passing on to the fifth step e5.

Cleverly, by virtue of the method of the invention, it is possible to modify at least one low current level and one high current level of a current source sensor in order, during operation of the internal combustion engine, and therefore during operation of the sensors 20, 20', to avoid measurement conflicts that lead to errors in estimating the positions of the internal combustion engine.

By virtue of the invention, it is now possible to couple two current source sensors in parallel, using software to modify the current levels of at least one of the two sensors in order to facilitate the processing of the information coming from said current source sensors.

The invention claimed is:

1. A current source sensor for delivering detection information of a passage of a mobile target as a variation of a generated current, comprising:
   an output for connection with a communication bus;
   a sensing element electrically reactive to passage of the mobile target past the sensing element, and electronics adapted to generate, from signals received from the sensing element, an intermediate signal to the output as a current having, dependent upon the passage of the mobile target past the sensing element, one of a first low level and a first high level; and
   an embedded intelligence module that measures a current of a first signal at the output and, responsive to a current level of the current of the first signal, modifies any of the first low level and the first high level of the intermediate signal respectively into a second low level and into a second high level.

2. An assembly, comprising:
   a communication bus; and
   first and second current source sensors electrically coupled to one another in parallel via the communication bus,
   each one of said first and second current source sensors comprised of
      an output for connection with the communication bus,
      a sensing element electrically reactive to passage of a mobile target past the sensing element, and electronics adapted to generate, from signals received from the sensing element, an intermediate signal to the output as a current having, dependent upon the passage of the mobile target past the sensing element, one of a first low level and a first high level, and
      an embedded intelligence module that measures a current of a first signal at the output and, responsive to a current level of the current of the first signal, modifies any of the first low level and the first high level of the intermediate signal respectively into a second low level and into a second high level,
   the communication bus being adapted to pass the first signal constituting a sum of a first intermediate signal generated by the first current source sensor and of a second intermediate signal generated by the second current source sensor.

3. The assembly of at least two current source sensors as claimed in claim 2, wherein the first and second current source sensors are coupled to an electronic computer.

4. A method for determining a state of rotation of at least one rotary shaft of an internal combustion engine, comprising:

a. a first step (e1) of activating first and second current source sensors;
   b. a second step (e2) of detecting passage of a tooth of a target by the first current source sensor, and generating as a first intermediate signal a square-wave pulse indicative of said passage of the tooth past the first current source sensor;
   c. a third step (e3) of measuring a first signal passing along a communication bus, the first signal being a sum of the first intermediate signal generated by the first current source sensor and a second intermediate signal generated by the second current source sensor, and determining from said first signal that the first current source sensor generates a first high level on the first intermediate signal and that a measure of the first signal value corresponds to a first critical value; and
   d. a fourth step (e4) of modifying a first low level of the first intermediate signal to a second low level, and also modifying the first high level of the first intermediate signal to a second high level.

5. The method for determining the state of rotation of at least one rotary shaft of an internal combustion engine as claimed in claim 4, wherein the first low level exhibits a value of 7 mA, and the first high level exhibits a value of 14 mA.

6. The method for determining the state of rotation of at least one rotary shaft of an internal combustion engine as claimed in claim 4, wherein the first critical value is a value of 21 mA.

7. The method for determining the state of rotation of at least one rotary shaft of an internal combustion engine as claimed in claim 4, wherein the second low level exhibits a value of 10 mA, and the second high level exhibits a value of 20 mA.

8. The method for determining the state of rotation of at least one rotary shaft of an internal combustion engine as claimed in claim 4, wherein the engine is turning.

9. The method for determining the state of rotation of at least one rotary shaft of an internal combustion engine as claimed in claim 5, wherein the first critical value is a value of 21 mA.

10. The method for determining the state of rotation of at least one rotary shaft of an internal combustion engine as claimed in claim 5, wherein the second low level exhibits a value of 10 mA, and the second high level exhibits a value of 20 mA.

11. The method for determining the state of rotation of at least one rotary shaft of an internal combustion engine as claimed in claim 6, wherein the second low level exhibits a value of 10 mA, and the second high level exhibits a value of 20 mA.

12. The method for determining the state of rotation of at least one rotary shaft of an internal combustion engine as claimed in claim 5, wherein the engine is turning.

13. The method for determining the state of rotation of at least one rotary shaft of an internal combustion engine as claimed in claim 6, wherein the engine is turning.

14. The method for determining the state of rotation of at least one rotary shaft of an internal combustion engine as claimed in claim 7, wherein the engine is turning.

15. The method for determining the state of rotation of at least one rotary shaft of an internal combustion engine as claimed in claim 11, wherein the engine is turning.

16. The method for determining the state of rotation of at least one rotary shaft of an internal combustion engine as claimed in claim 12, wherein the engine is turning.

* * * * *